US 7,385,878 B2

(12) United States Patent
Cho

(10) Patent No.: US 7,385,878 B2
(45) Date of Patent: Jun. 10, 2008

(54) LOCAL TIME ADJUSTING METHOD OF MOBILE COMMUNICATION TERMINAL

(75) Inventor: Yoon Ho Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 970 days.

(21) Appl. No.: 10/845,214

(22) Filed: May 14, 2004

(65) Prior Publication Data

US 2004/0228428 A1 Nov. 18, 2004

(30) Foreign Application Priority Data

May 15, 2003 (KR) ...................... 10-2003-0030977

(51) Int. Cl.
*G04C 11/02* (2006.01)
*G04C 13/00* (2006.01)
*H04B 1/38* (2006.01)
(52) U.S. Cl. ........................... 368/46; 368/47; 455/566
(58) Field of Classification Search .................. 368/10, 368/46, 47, 52, 59; 455/414.1, 414.3, 566
See application file for complete search history.

(56) References Cited

U.S. PATENT DOCUMENTS

| | | | | |
|---|---|---|---|---|
| 5,642,355 A | * | 6/1997 | Smith | 370/337 |
| 6,282,431 B1 | | 8/2001 | Konno | 455/550 |
| 6,300,899 B1 | * | 10/2001 | King | 342/357.12 |
| 6,556,512 B1 | * | 4/2003 | Winkler | 368/47 |
| 6,678,510 B2 | * | 1/2004 | Syrjarinne et al. | 455/255 |
| 6,771,990 B1 | * | 8/2004 | Nilsson | 455/566 |
| 6,788,249 B1 | * | 9/2004 | Farmer et al. | 342/357.12 |
| 6,826,123 B1 | * | 11/2004 | Herring | 368/46 |
| 6,876,600 B2 | * | 4/2005 | Ito et al. | 368/21 |
| 6,959,192 B1 | * | 10/2005 | Cannon et al. | 455/456.3 |
| 6,963,192 B2 | * | 11/2005 | Schultz | 324/66 |
| 6,963,588 B1 | * | 11/2005 | Lynch et al. | 370/516 |

FOREIGN PATENT DOCUMENTS

| | | |
|---|---|---|
| JP | 2002-218546 | 8/2002 |
| KR | 10-0237443 | 1/2000 |
| KR | 2002-0065586 | 8/2002 |
| KR | 2003-0071772 | 9/2003 |
| WO | WO 01/47220 A2 | 6/2001 |
| WO | WO 02/061973 A1 | 8/2002 |
| WO | WO 02/061973 A1 | 8/2002 |

OTHER PUBLICATIONS

Office Action issued in corresponding Korean application by the Korean Intellectual Property Office on Dec. 22, 2004.

* cited by examiner

*Primary Examiner*—Vit W Miska
(74) *Attorney, Agent, or Firm*—Ked & Associates, LLP

(57) ABSTRACT

A local time adjusting method of a mobile communication terminal includes extending 6-bit local time offset contained in a sync channel message transmitted from a base station to a 7-bit local time offset to calculate an actual local time offset in a corresponding area; and substituting the calculated local time offset (extend_LTM_OFF) and time information to equation (SYS_TIME+(LP_SEC*12.5)+(extend_LTM_OFF*11250)) to calculate local time of a current location. By doing that, local time can be adjusted by units of 15 minutes even in an area where 30-minute adjustment of local time offset is not available, and thus, local time can be precisely calculated anywhere in the world.

16 Claims, 1 Drawing Sheet

LOCAL TIME ADJUSTING METHOD OF MOBILE COMMUNICATION TERMINAL

BACKGROUND OF THE INVENTION

1. Field of the Invention

The present invention relates to a local time adjusting method of a mobile communication terminal and, more particularly, to a local time adjusting method of a mobile communication terminal capable of extending accuracy for a local time offset by the mobile communication terminal itself.

2. Description of the Background Art

In general, in a mobile communication, a CDMA (Code Division Multiple Access) terminal calculates a local time of an area where the CDMA terminal itself is positioned upon receiving a synchronous channel message from a base station through a sync channel.

Table 1 illustrates a data structure of a CDMA standard synchronous channel message, including a protocol version (P_REV) field provided for service in a current system, a system time (SYS_TIME) related to time, leap seconds (LP_SEC), an offset of local time (LTM_OFF), a daylight savings time (DAYLT), or the like.

TABLE 1

| Field | Length (bits) |
|---|---|
| P_REV | 8 |
| ... | ... |
| SYS_TIME | 36 |
| LP_SEC | 8 |
| LTM_OFF | 6 |
| DAYLT | 1 |
| ... | ... |

The system time (SYS_TIME) is synchronized with a UTC (Coordinated Universal Time), and corresponds to a GPS (Global Position System) time counted in units of 80 ms based upon zero seconds, zero minutes and zero hours, Jan. 6, 1980.

The offset of local time (LTM_OFF), which means a GMT (Greenwich Mean Time) correction value (offset value) of a corresponding area, is counted 1 by 1 in units of 30 minutes and indicated as a complement of '2' of 6 bits. At this time, a range that can be adjusted by 6 bits are 32 to 31, Which equivalent to −16~+15 hours and 30 minutes when calculated by the unit of 30 minutes.

For instance, LTM_OFF of Kansas City in the United States is 110100 (6 bits, complement of '2'), which is equivalent to 12 as a decimal. Since 110100 is a value obtained by counting 1 for every 30 minutes, so that, actually, it is −6 hours. Namely, the LTM_OFF of the Kansas City is GMT −6:00.

The daylight savings time indicator (DAYLT) is '1' if the daylight savings time is valid, and '0' if the daylight savings time is not valid.

The local time in accordance with a related art is calculated by extracting time-related data from the sync channel and substituting it to equation (1) shown below:

$$\text{local time} = SYS\_TIME - (LP\text{-}SEC \times 12.5) + (LTM\_OFF \times 22500) \quad (1)$$

wherein '12.5' is a count value (1 sec/80×10-3 sec) used for coordinating 1 second in units of 80 ms, and '25000' is a count value used for coordinating 30 minutes (0.5 hour) in units of 80 ms.

A local time calculated by equation (1) is a value obtained by counting time by the unit of 80 ms starting from 0 seconds, 0 minutes and 0 hours, Jan. 6, 1980 in a corresponding area, and a mobile communication terminal outputs the present time at a present location (of the user) on a display unit by applying the local time.

As mentioned above, most countries adjusts a local time by the unit of 30 minutes on the basis of the GMT, but in some areas of Nepal (GMT+5:45) or New Zealand, a difference by the unit of 15 minutes, not 30 minutes, is made over the GMT.

Namely, in the local time adjusting method of a mobile communication terminal, the local time is calculated by using a value of the LTM_OFF field counted in units of 30 minutes, so that for a mobile communication terminal in an area, such Nepal (GMT+5.45), where 15 minutes of difference is made over the GMT, a difference of a maximum −15 minutes (in case of GMT+5.30) or +15 minutes (in case of GMT+6:00) compared to actual local time is made.

In addition, in order to solve the above problems, existing CDMA standards should be changed to change the value of the LTM_OFF field to a value of 7 bits in units of 15 minutes. Then, changing of the CDMA standards should accompany change of all the mobile communication systems.

SUMMARY OF THE INVENTION

Therefore, an object of the present invention is to provide a local time adjusting method of a mobile communication terminal capable of calculating a local time accurately even for an area where local time cannot be calculated with a local time offset in units of 30 minutes by adjusting the local time offset in units of 30 minutes by a local time offset in units of 15 minutes by extending an accuracy of the local time offset in a mobile communication terminal.

To achieve at least the above object in whole or in parts, there is provided a local time adjusting method of mobile communication terminal which receives a sync channel message having time information from a base station, including: extending a 6-bit local time offset (LTM_OFF) contained in the sync channel message to 7-bit local time offset in order to calculate an actual local time offset in a corresponding area; and calculating local time in a current area by using the obtained local time offset (extend_LTM_OFF) and the time information.

To achieve at least these advantages in whole or in parts, there is further provided a local time adjusting method of a mobile communication terminal, including: receiving a sync channel message having time information from a base station; detecting a 6-bit local time offset from the sync channel message and extending it to 7 bits; adding the extended local time offset and a quarter flag stored in the mobile communication terminal; calculating local time by using the addition result (extend_LTM_OFF) and time information; and converting the local time into a screen output form of the mobile communication terminal and displaying it.

To achieve at least these advantages in whole or in parts, there is further provided a local time adjusting method of a mobile communication terminal, including: detecting a 6-bit local time offset from a sync channel message transmitted to a base station; extending the 6-bit local time offset to a 7-bit local time offset and converting a local time offset in units of 30 minutes to a local time offset in units of 15 minutes; selecting a quarter flag stored in an internal memory of a mobile communication terminal; adding the 7-bit local time offset and the quarter flag and adjusting it as an actual local time offset; substituting the adjusted local time offset and time information contained in the sync channel message to equation shown below and calculating it; and converting an obtained result value into a screen output form of the mobile communication terminal and displaying it:

local time=$SYS\_TIME+(LP\_SEC*12.5)+(extend\_LTM\_OFF*11250)$, wherein SYS_TIME is a UTC, LP_SEC is leap seconds, 12.5 is a count value (1 sec/80×10$^{-3}$ sec) used for coordinating 1 seconds in units of 80 ms, and '11250' is a count value used for coordinating 15 minutes (0.25 hour) in units of 80 ms (0.25 hour×3600 sec/80×10$^{-3}$ sec).

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
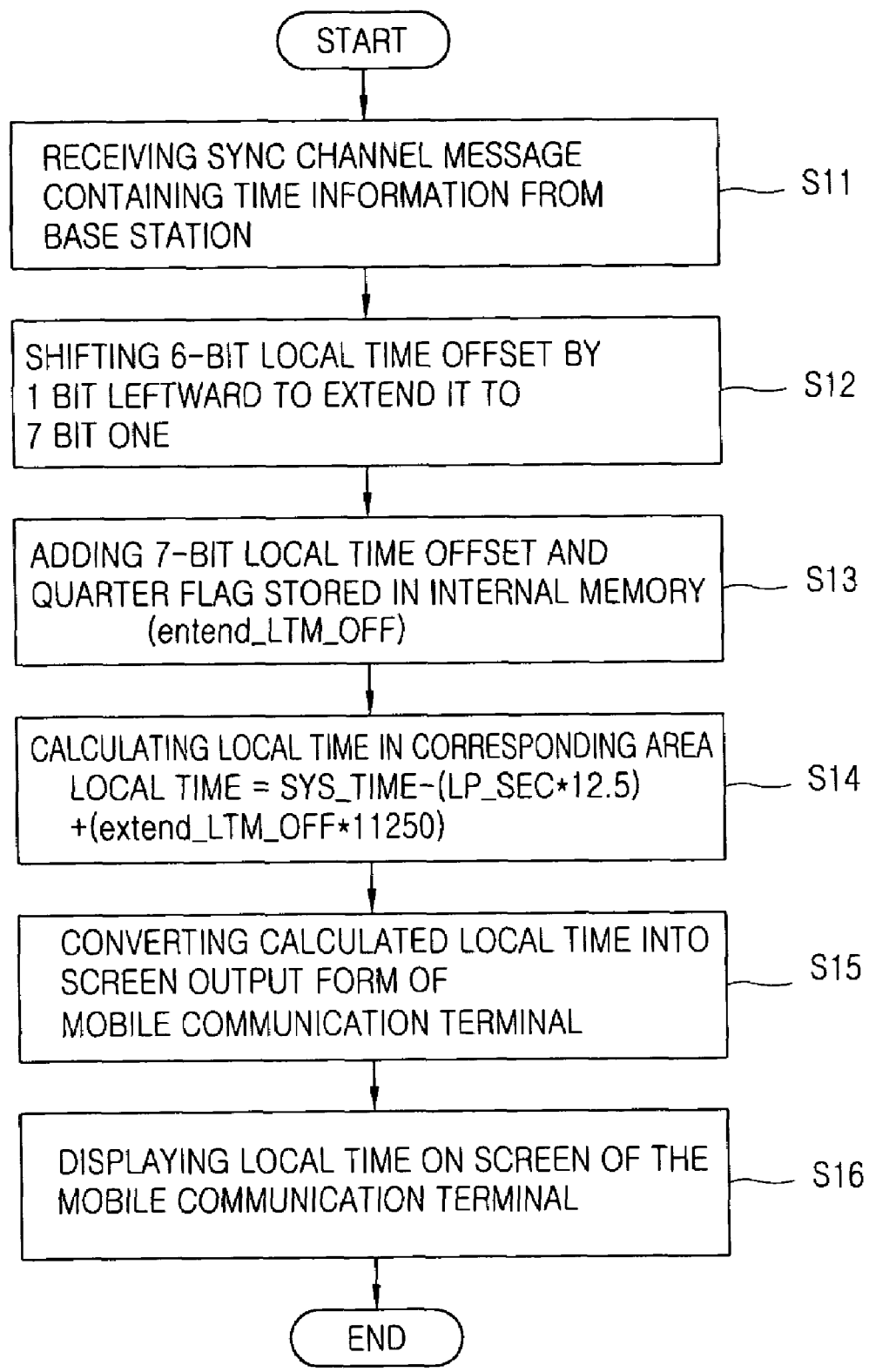
FIG. 1 is a flow chart of a local time adjusting method of a mobile communication terminal in accordance with a preferred embodiment of the present invention.

A local time adjusting method of a mobile communication terminal will now be described with reference to the accompanying drawings.

In the local time adjusting method of a mobile communication terminal in accordance with the present invention, a mobile communication terminal extendedly calculates a 6-bit offset of local time received through a sync channel transmitted from a base station to a 7-bit offset of local time, whereby local time is adjusted in units of 15 minutes to extend precision. Namely, the mobile communication terminal itself extendedly calculates the 6-bit offset of local time defined in current CDMA standards by 1 bit.

FIG. 1 is a flow chart of a local time adjusting method of a mobile communication terminal in accordance with a preferred embodiment of the present invention.

As shown in FIG. 1, the mobile communication terminal receives a sync channel message including time information (SYS_TIME, LP_SEC, LTM_OFF, etc.) from the base station (step S11).

A controller of the mobile communication terminal detects a 6-bit LTM_OFF value from the received sync channel message and arithmetically shifts it by 1 bit leftward, to extend the 6 bit value to a 7 bit value (step S12). Because the 6-bit LTM_OFF value counted by 1 in units of 30 minutes is extended to the 7 bit value, the 6-bit value can be converted into a value counted 1 by 1 in units of 15 minutes.

A quarter flag stored in an internal memory of the mobile communication terminal is added to the 7-bit extended LTM_OFF value (step S13). At this time, the quarter flag is 1111111, 0000000 and 0000001 equivalent to -1, 0 and 1.

The quarter flag-added LTM_OFF (extend_LTM_OFF) and values detected from the sync channel message are replaced with a decimal number and then substituted to equation (2) shown below to calculate a local time in a corresponding area (step S14).

$$\text{Local time}=SYS\_TIME+(LP+SEC*12.5)+(\text{extend\_}LTM\_OFF*11250)\text{-} \quad (2)$$

wherein 12.5 is a count value (1 sec/80×10$^{-3}$ sec) used for coordinating 1 seconds in units of 80 ms, and '11250' is a count value used for coordinating 15 minutes (0.25 hour) in units of 80 ms (0.25 hour×3600 sec/80×10$^{-3}$ sec).

The local time calculated through equation (2) is converted into a screen output form of the mobile communication terminal (step S15), and the converted local time information is outputted to the screen of the mobile communication terminal (step S16). At this time, the local time information outputted to the mobile communication terminal is current time at a current location.

Local time in an area of Nepal can be calculated as follows by using the local time adjusting method of a mobile communication terminal in accordance with the present invention.

An actual local time offset in the area of Nepal is GMT+5:45, having a difference of a maximum +/-15 minutes from a local time offset value of the CDMA standards counted in units of 30 minutes. Namely, when a base station transmits a sync channel message to a mobile communication terminal in the area of Nepal, the LTM_OFF value contained in the sync channel message is selected as 5 hours and 30 minutes or 6 hours and transmitted as such.

First, in case that the base station designates an LTM_OFF value as 5 hours and 30 minutes for its transmission, the LTM_OFF value contained in the sync channel message is 001011, which is equivalent to a decimal number of 11 11*30 minutes=330 minutes=5 hours and 30 minutes. Namely, 6 bits and binary number of 001011 is transmitted as the LTM_OFF value of the sync channel message.

Upon receiving the sync channel message, the mobile communication terminal arithmetically shifts the LTM_OFF value by 1 bit leftward, adds '0' to the lowermost bit to extend it to 7 bits, and then, adds a quarter flag to the value. In this case, the extended LTM_OFF value is 0010110, the quarter flag is 0000001, and the added result value is 0010111.

In other words, by extending the 6-bit LTM_OFF value to 7 bits, the LTM_OFF value in units of 30 minutes is converted in to the LTM_OFF value in units of 15 minutes, to which the quarter flag is added, that is, a difference (+15 minutes) between the actual local time offset and the LTM_OFF value contained in the sync channel message, thereby calculating a precise LTM_OFF value in the corresponding area.

The result value 0010111 is 23 in decimal, and the unit of counting is interpreted by units of 15 minutes, not 30 minutes. Accordingly, the result value 23 indicates that a local time offset in the corresponding area is +345 minutes (23*15 minutes), which is equivalent to GMT+5:45.

The result value 23 and the time related information contained in the sync channel message are substituted to equation (2) to output a count value in units of 80 ms, and then, current time is adjusted and outputted to the screen of the mobile communication terminal.

Second, if the base station designates the LTM_OFF value as 6 hours and transmits it, the LTM_OFF value contained in the sync channel message is 001100, equivalent to 12 in decimal (12*30 minutes=360 minutes=6 hours).

When the LTM_OFF value is arithmetically shifted by 1 bit so as to be extended to 7 bits, it becomes 0011000. When 1111111 (complement of 2 of −1), the quarter flag, is added thereto, it becomes 0010111. At this time, an overflown bit exceeding 7 bits is discarded from the added value.

Because the result value 0010111 is 23 in decimal and the local time offset in the corresponding area is GMT+5:45, time can be precisely calculated in units of 15 minutes as in the case where the base station sets the LTM_OFF value as 5 hours 30 minutes and transmits it.

Local time of an area having a local time offset in units of 30 minutes can be calculated by using the local time adjusting method of a mobile communication terminal in accordance with the preferred embodiment of the present invention as follows.

The local time offset in Kansas City in the United States is GMT −6:00, and an LTM_OFF value of the sync channel message transmitted from the base station is 110100 (complement of 2 of −12) in decimal.

Upon receiving the sync channel message, the mobile communication terminal arithmetically shifts 110100, the LTM_OFF value by 1 bit leftward to calculate 1101000.

By adding the quarter flag value 0000000 to the 1101000, the local time offset in units of 30 minutes is converted into a local time offset in units of 15 minutes.

Because the converted value 1101000 is a complement of 2 over −24 in decimal and the count unit is 15 minutes, not 30 minutes, a local time offset inn Kansas City is −360 minutes (−24*15 minutes), namely, GMT −6:00.

The result value −24 and time-related information contained in the sync channel message are substituted to equation (2) to output a count value in units of 80 ms, whereby current time is adjusted and outputted on the screen of the mobile communication terminal.

Accordingly, by extending the 6-bit LTM_OFF value transmitted from the base station by 1 bit to 7-bit LTM_OFF value in the mobile communication terminal, precision with respect to the local time offset can be heightened.

As so far described, the local time adjusting method of a mobile communication terminal in accordance with the present invention has the following advantages.

That is, because the mobile communication itself converts the 6-bit local time offset presented in the existing CDMA standards into the 7-bit local time offset, the precision of the local time offset can be improved, and even local time in some areas where 30 minute-adjustment is not available, the local time can be precisely adjusted.

In addition, because local time can be adjusted by units of 15 minutes by changing only the form of processing the LTM_OFF value by the mobile communication terminal, an additional cost that may incur for replacement of a base station system can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A local time adjusting method of a mobile communication terminal which receives a sync channel message having time information from a base station, comprising:

extending a 6-bit local time offset (LTM_OFF) contained in the sync channel message to 7-bit local time offset in order to calculate an actual local time offset in a corresponding area; and calculating local time in a current area by using the obtained local time offset (extend_LTM_OFF) and the time information.

2. The method of claim 1, wherein the local time is calculated by equation shown below:

Local time=$SYS$_TIME+($LP$_SEC*12.5)+(extend_LTM_OFF*11250), wherein SYS_TIME is a UTC, LP_SEC is leap seconds, 12.5 is a count value (1 sec/80×10$^{-3}$ sec) used for coordinating 1 seconds in units of 80 ms, and '11250' is a count value used for coordinating 15 minutes (0.25 hour) in units of 80 ms (0.25 hour×3600 sec/80×10$^{-3}$ sec).

3. The method of claim 1, wherein the step of calculating an actual local time offset comprises:

extending a 6-bit local time offset to a 7-bit local time offset; and adding a quarter flag previously stored in the mobile communication terminal to the 7-bit local time offset.

4. The method of claim 3, wherein the step of extending to the 7-bit local time offset comprises:

arithmetically shifting the 6-bit local time offset by 1 bit leftward; and adding '0' to the lowermost bit.

5. The method of claim 3, wherein the quarter flag is 0000001, 0000000, 1111111, complements of 2 equivalent to +1, 0 and −1 and stored in an internal memory of the mobile communication terminal.

6. The method of claim 3, wherein the quarter flag is a difference between the 7-bit extended local time offset and an actual local time offset of a corresponding area.

7. A local time adjusting method of a mobile communication terminal comprising:

receiving a sync channel message including time information from a base station;

detecting a 6-bit local time offset from the sync channel message and extending the 6-bit local time to a 7-bit local time offset;

adding the extended local time offset and a quarter flag stored in a mobile communication terminal;

calculating local time by using the addition result (extend_LTM_OFF) and time information; and converting the local time into a screen output form of the mobile communication terminal and displaying it.

8. The method of claim 7, wherein, in the step of extending to 7-bit local time offset, the 6-bit local time offset counted in units of 30 minutes over GMT (Greenwich Mean Time) is calculated to a local time offset counted in units of 15 minutes.

9. The method of claim 7, wherein the step of extending to 7-bit local time offset comprises:

arithmetically shifting the 6-bit local time offset by 1 bit leftward; and adding '0' to the lowermost bit.

10. The method of claim 7, wherein the quarter flag is a difference between the 7-bit extended local time offset and an actual local time offset of a corresponding area.

11. The method of claim 10, wherein the quarter flag is 0000001 equivalent to +1 if the difference over GMT is +15 minutes, 1111111 (complement of 2) equivalent to −1 if the difference over GMT is −15, and 0000000 in other cases.

12. The method of claim 7, wherein the step of calculating the local time comprises:

replacing the 7-bit local time offset and time information with decimal number; and substituting the replaced values to equation shown below:

$$\text{local time} = SYS\_TIME + (LP\_SEC*12.5) + (\text{extend\_}LTM\_OFF*11250),$$

wherein SYS_TIME is a UTC, LP_SEC is leap seconds, 12.5 is a count value (1 sec/80×10⁻³ sec) used for coordinating 1 seconds in units of 80 ms, and '11250' is a count value used for coordinating 15 minutes (0.25 hour) in units of 80 ms (0.25 hour×3600 sec/80×10⁻³ sec).

13. A local time adjusting method of a mobile communication terminal, comprising:

detecting a 6-bit local time offset from a sync channel message transmitted to a base station;

extending the 6-bit local time offset to a 7-bit local time offset and converting a local time offset in units of 30 minutes to a local time offset in units of 15 minutes;

selecting a quarter flag stored in an internal memory of a mobile communication terminal;

adding the 7-bit local time offset and the quarter flag and adjusting it as an actual local time offset;

substituting the adjusted local time offset and time information contained in the sync channel message to equation shown below and calculating it; and converting an obtained result value into a screen output form of the mobile communication terminal and displaying it;

$$\text{local time} = SYS\_TIME + (LP\_SEC*12.5) + (\text{extend\_}LTM\_OFF*11250),$$

wherein SYS_TIME is a UTC, LP_SEC is leap seconds, 12.5 is a count value (1 sec/80×10⁻³ sec) used for coordinating 1 seconds by units of 80 ms, and '11250' is a count value used for coordinating 15 minutes (0.25 hour) in units of 80 ms (0.25 hour×3600 sec/80×10⁻³ sec).

14. The method of claim 13, wherein, in the step of extending to 7-bit local time offset, the 6-bit local time offset is arithmetically shifted by 1 bit leftward and '0' is added to the lowermost bit.

15. The method of claim 13, wherein if a difference between a local time offset of a sync channel message and an actual time over the GMT is +15, the quarter flag is set as 0000001, if the difference between a local time offset of the sync channel message and the actual time over the GMT is −15, the quarter flag is set as 1111111 (complement of 2 over 1), and if there is no difference between the local time offset of the sync channel message and the actual time over the GMT, the quarter flag is set as 0000000.

16. The method of claim 13, wherein, in the calculating step, the adjusted local time offset and the time information are replaced with decimal and then substituted.

* * * * *